(12) United States Patent
Neuberger et al.

(10) Patent No.: US 7,783,475 B2
(45) Date of Patent: Aug. 24, 2010

(54) MENU-BASED, SPEECH ACTUATED SYSTEM WITH SPEAK-AHEAD CAPABILITY

(75) Inventors: Marc J. Neuberger, Arlington, MA (US); Erin M. Panttaja, Somerville, MA (US)

(73) Assignee: Comverse, Inc., Wakefield, MA (US)

( * ) Notice: Subject to any disclaimer, the term of this patent is extended or adjusted under 35 U.S.C. 154(b) by 1157 days.

(21) Appl. No.: 10/355,126

(22) Filed: Jan. 31, 2003

(65) Prior Publication Data

US 2004/0153322 A1    Aug. 5, 2004

(51) Int. Cl.
*G10L 15/00* (2006.01)

(52) U.S. Cl. .......................... 704/10; 704/251; 704/257

(58) Field of Classification Search ................... 704/10, 704/251, 257
See application file for complete search history.

(56) References Cited

U.S. PATENT DOCUMENTS

| | | | |
|---|---|---|---|
| 5,802,526 | A | 9/1998 | Fawcett et al. |
| 5,953,393 | A | 9/1999 | Culbreth et al. |
| 5,995,918 | A | 11/1999 | Kendall et al. |
| 6,157,705 | A | 12/2000 | Perrone |
| 6,269,336 | B1 | 7/2001 | Ladd et al. |
| 6,314,402 | B1 | 11/2001 | Monaco et al. |
| 6,526,382 | B1 * | 2/2003 | Yuschik ........................ 704/275 |
| 6,717,593 | B1 * | 4/2004 | Jennings ....................... 715/760 |
| 6,944,592 | B1 * | 9/2005 | Pickering ..................... 704/251 |
| 6,985,865 | B1 * | 1/2006 | Packingham et al. ......... 704/275 |
| 7,050,976 | B1 * | 5/2006 | Packingham .................. 704/270 |
| 7,231,379 | B2 * | 6/2007 | Parikh et al. ..................... 707/2 |
| 7,370,056 | B2 * | 5/2008 | Parikh et al. ................. 707/101 |
| 2004/0098381 | A1 * | 5/2004 | Parikh et al. ..................... 707/3 |
| 2004/0169679 | A1 * | 9/2004 | Parikh et al. ................. 345/738 |
| 2004/0181392 | A1 * | 9/2004 | Parikh et al. ................... 704/10 |
| 2005/0028085 | A1 * | 2/2005 | Irwin et al. ................... 715/513 |
| 2005/0060304 | A1 * | 3/2005 | Parikh ............................ 707/3 |

FOREIGN PATENT DOCUMENTS

WO    WO 00/78022 A1 * 12/2000

OTHER PUBLICATIONS

Walker, et al., "What Can I Say?: Evaluating a Spoken Language Interface to Email"; Proceedings of the SIGCHI Conference on Human Factors in Computing Systems, Apr. 1998; pp. 582-589.

* cited by examiner

*Primary Examiner*—Daniel D Abebe
(74) *Attorney, Agent, or Firm*—Ohlandt, Greeley, Ruggiero & Perle, L.L.P.

(57) ABSTRACT

An interactive voice response system has speak-ahead capabilities similar to type-ahead IVR systems by determining multi-level grammars for responses. Preferably, an existing IVR application is processed automatically to generate a multi-level grammar database that can then be used in recognizing multi-level responses by a user.

2 Claims, 5 Drawing Sheets

| State | Grammar | Next State | Terminal? | Prompt? | Action |
|---|---|---|---|---|---|
| Main Menu | messages | Mailbox | no | no | |
| Main Menu | settings | Setup | no | no | |
| Main Menu | greetings | Greet | no | no | |
| Mailbox | repeat | Mailbox | no | no | Play current message |
| Mailbox | previous | Mailbox | no | no | Move to previous message, play |
| Mailbox | next | Mailbox | no | no | Move to next message, play |
| Mailbox | delete | Mailbox | no | yes | Delete current message |
| Mailbox | save | Mailbox | no | yes | Save current message |
| Setup | passcode | Setup | yes | N/A | Query caller for new passcode |
| Setup | notification | Notify | no | no | |
| Greet | play | Greet | no | yes | Play current greeting |
| Greet | record | Greet | yes | N/A | Record greeting |
| Greet | delete | Greet | no | yes | Delete greeting |
| Notify | on | Setup | no | yes | Turn notifications on |
| Notify | off | Setup | no | yes | Turn notifications off |

FIG. 4

MENU-BASED, SPEECH ACTUATED SYSTEM WITH SPEAK-AHEAD CAPABILITY

BACKGROUND OF THE INVENTION

1. Field of the Invention

The present invention is directed to processing user input in a menu-based, speech actuated system and, more particularly, to recognizing speech input in response to a prompt and respectively applying words or phrases in a single user response to a sequence of prompts in a menu.

2. Description of the Related Art

Automated systems that respond to user input from a telephone accept either key-pad, usually dual-tone multifrequency (DTMF), signals or speech input, or both. Such systems are often referred to as interactive voice response (IVR) systems. For both types of inputs, prompts are generated by the system using synthesized or recorded speech. Many of these systems interact with users based on a menu structure that defines the prompts to be generated and a set of user commands that will be accepted at any instant in the user interaction.

Many IVR systems use DTMF, or touchtone, keys to allow a user to give input to an interactive phone-based system. Typically, audio is played which presents the user with a set of options, each corresponding to a particular DTMF key. Some of these options represent commands and some options navigate the caller to further menus.

It is common for systems that accept DTMF signals to permit users to enter a series of inputs, such as "1, 1 and 2" in response to a prompt requesting the input of only a single digit. The subsequent digits, "1 and 2," are interpreted as responses to, respectively, the prompts that would have been generated after receiving the initial "1" and the second "1". This is ordinarily referred to as "type ahead" capability. As users become familiar with DTMF based systems, and memorize the keys that correspond to certain commands, they begin to use "type-ahead". Type-ahead allows users to type a sequence of keys and thereby execute a sequence of commands and navigations without listening to the intervening prompts. This feature provides a substantially faster interface for the experienced user, and users have come to expect this feature from IVR systems.

Many speech-based systems are structured in much the same way as these IVR systems are. As in DTMF systems, the user has a small number of options at any given time. They are presented with menus, and can say one of a small number of words which perform commands or navigate to submenus, so that the user can say "play", for example, rather than press 1. However, conventional systems that accept speech input do not have a "speak ahead" capability similar to "type ahead" to process speech input as responses to prompts that have not yet been generated.

The way grammar-based speech recognition engines typically work means that "speak-ahead" will not work. If the user says "next next play", this whole utterance will be matched against the current grammar which may only have "next", "play" and other single words in it. Thus, the user has to say "next", pause a sufficient amount of time for the word to be recognized as a full utterance, say "next", pause, and say "play". This is inconvenient for the expert user.

It is more difficult to have "speak ahead" capability than "type ahead" capability because speech input is more difficult to recognize than keypad input. Recognition accuracy of DTMF is essentially 100%, while conventional systems that accept speech input have more difficulty recognizing words. Accepting speech input from any user, i.e., without prior training to individual voices, increases the difficulty of determining which response was input. Therefore, the set of permissible utterances is normally limited as much as possible to achieve the best recognition accuracy. Thus, a DTMF detection module can listen for all DTMF sequences, even invalid sequences, while in a speech-based system, listening for invalid command sequences reduces the recognition accuracy.

SUMMARY OF THE INVENTION

It is an aspect of the present invention to provide an interactive voice response system that permits users to "speak ahead" and provide responses to prompts that have not been generated at the time that the responses are input.

The above aspects can be attained by a method of processing speech input to an interactive voice response system generating prompts based on a menu, including recognizing speech input in response to a current prompt based on a grammar of acceptable responses that includes utterances responding to at least one subsequent prompt. Such recognition may be made possible by determining the grammar of acceptable responses by adding to at least one possible response to the current prompt, at least one possible subsequent response to the at least one subsequent prompt. The determining is preferably performed automatically after the menu and the grammar for a plurality of prompts have been defined, preferably in VoiceXML, so that the determining can be performed by a VoiceXML interpreter.

According to the invention, an interactive voice response system may be created by defining a hierarchical menu of prompts for users and a grammar of possible responses for each prompt, and determining a composite grammar of acceptable responses to a current prompt by adding to at least one possible response to the current prompt, at least one possible subsequent response to at least one subsequent prompt.

An interactive voice response system according to the invention may have at least one storage to store data defining prompts to users, grammars of acceptable responses and a hierarchical menu of the prompts, and a speech recognizer, coupled to the storage, configured to recognize input in response to a current prompt based on a composite grammar of acceptable responses that includes utterances responding to at least one subsequent prompt.

Generally the full menu tree is known when the application is built. Therefore, most or all speak-ahead possibilities can be supported by making the grammar at any point include the full set of traversals and partial traversals starting at the current state, rather than the set of single word transitions starting at the current state. If the menu structure is regarded as a finite state automaton, the grammar at any point must contain not just the transitions to the next state, but the paths starting at the current state of up to some maximum length.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a database structure for the menu illustrated in FIG. 3.

DETAILED DESCRIPTION OF THE PREFERRED EMBODIMENTS

Figure 1:
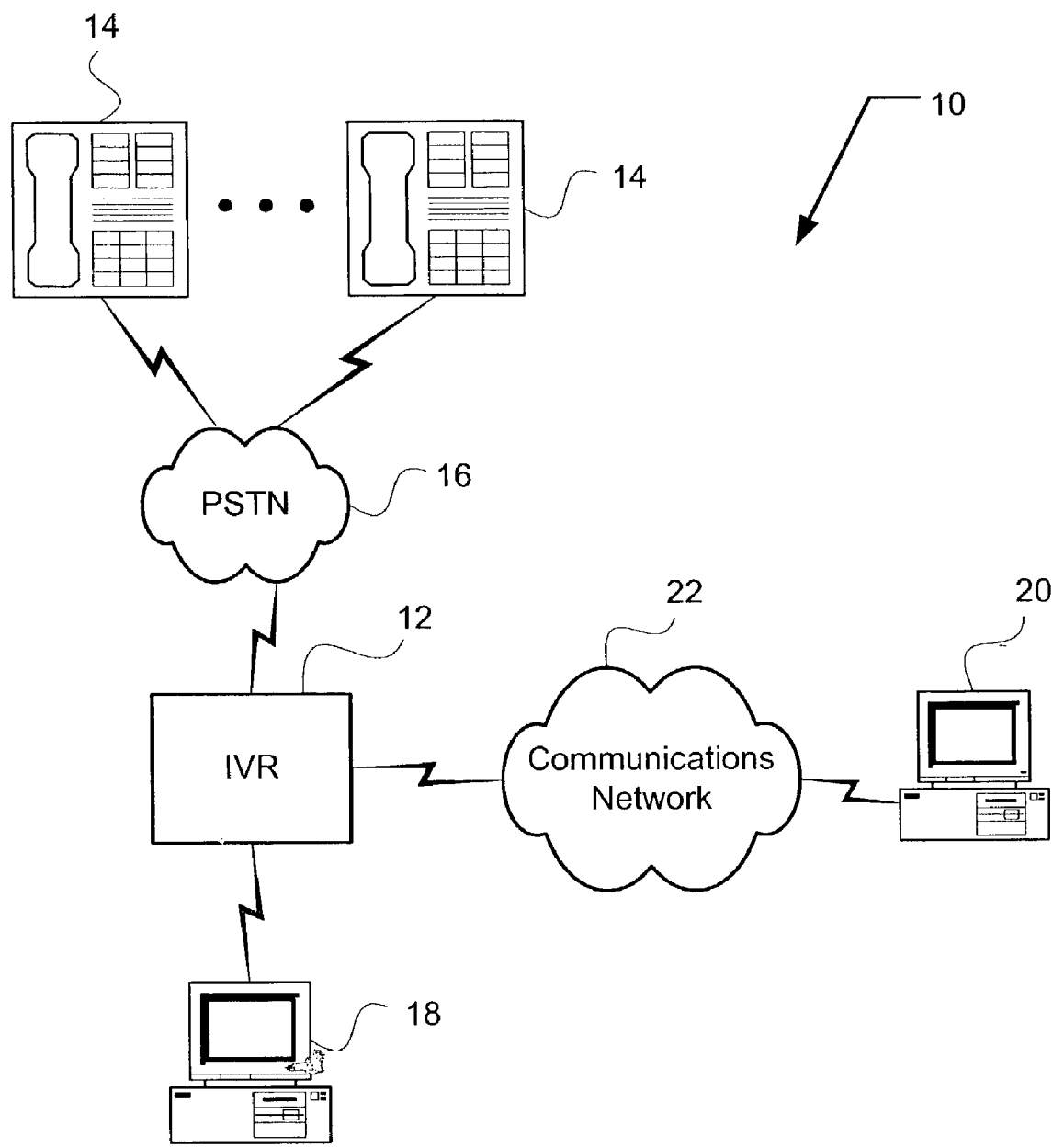
FIG. 1 is a block diagram of a communication system including an IVR system according to the present invention.

As illustrated in FIG. 1, the present invention may be utilized in an otherwise conventional system 10 including IVR system 12 which services users via telephones 14 which connect to IVR system 12 via a telecommunications network, such as the public switched telephone network (PSTN) 16. Administration of IVR system 12 may be performed by locally connected computer 18 or remote computer 20 connected via a network 22, such as the Internet. Computers 18 and 20 can be a Pentium-based computer with 1 MB memory, 4 GB system disk storage, that includes one or more network interface cards and voice processing cards, such as those manufactured by Comverse Network Systems, Inc.

The present invention may be implemented using many kinds of conventional IVR hardware and software, such as the TRILOGUE®Infinity system manufactured by Comverse Network Systems, Inc. of Wakefield, Mass. The host application software can include software for the present invention and the Tel@GO™ personal assistant application by Comverse Network Systems, Inc. of Wakefield, Mass. As described in more detail below, preferably IVR system 12 uses VoiceXML using a structured syntax to enable the present invention to run automatically with little editing by human operator(s). Examples of VoiceXML vendors or service providers include BeVocal, Inc. of Mountain View, Calif.; VoiceGenie Technologies Inc. of Toronto, Ontario, Canada; Nuance Communications Inc. of Menlo Park, Calif.; and TellMe Networks, Inc. of Mountain View, Calif.

Conventionally, IVR systems are developed using tools that run on local 18 or remote 20 computers. An example of such tool is disclosed in U.S. Pat. No. 6,314,402. Using these tools, it would be possible to manually create a new IVR application, or modify an existing IVR application that includes speak-ahead capabilities. However, this requires a lot of manual work that can be automated to add speak-ahead capability to existing IVR applications, provided the applications are stored in a format that can be processed by a program that adds speak-ahead capability as described below.

Figure 2:
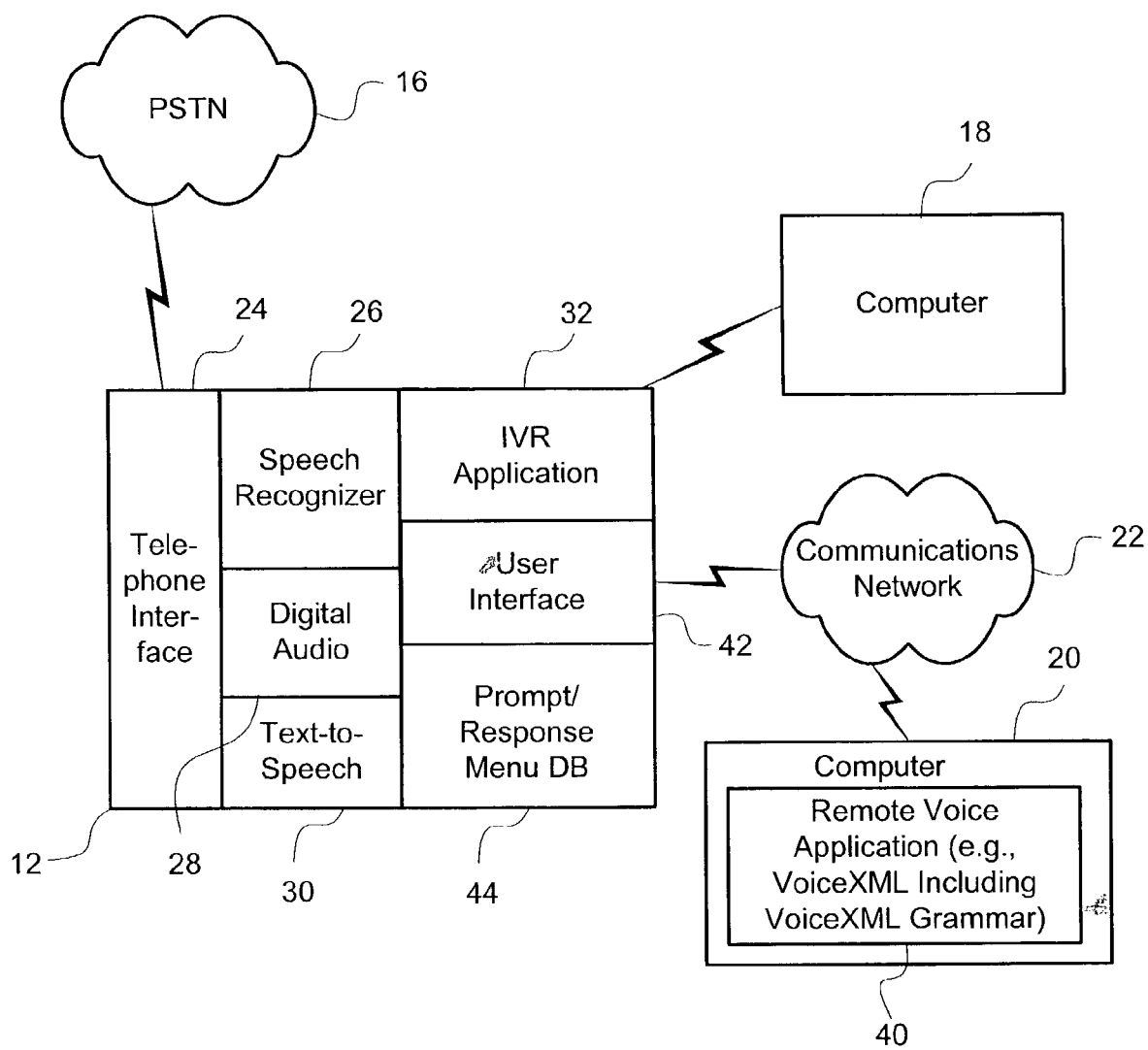
FIG. 2 is a block diagram of a system for developing an IVR system according to the present invention.

A more detailed block diagram of IVR system 12 is illustrated in FIG. 2 together with other components of system 10 in FIG. 1. Included in IVR system 12 which may be conventional hardware/software: telephone interface 24, speech recognizer 26, digital audio storage 28 and text-to-speech unit 30. Telephone interface 24 may be any conventional interface, such as those available from Intel Corporation of Santa Clara, Calif. and NMS Communications of Framingham, Mass. Speech recognizer 26 may be any commercially available speech recognition system, such as Speechworks from Speechworks International, Inc. of Boston, Mass.; Nuance from Nuance Communications Inc. and Philips Speech Processing available from Royal Philips Electronics N.V. in Vienna, Austria. Text-to-speech unit 30 may be a system using software available from AT&T Corp. of New York, N.Y.; AcuVoice from Fonix Corporation of Salt Lake City, Utah; or RealSpeak™ from ScanSoft, Inc. of Peabody, Mass. which currently distributes products developed by Dragon Software.

One or more IVR application(s) 32 may be conventional or may include speak-ahead capabilities. As described above, IVR application(s) 32 may be created using a voice application, such as remote voice application 40 running on remote computer 20. For those IVR application(s) 32 that do not include speak-ahead capabilities directly, a grammar analyzer in user interface 42 acts as an interpreter or a complier to add speak-ahead capabilities automatically, as described below. User interface 42 may use prompt/response menu (multi-level) database 44 to store information used in recognizing multi-level responses to a prompt received from a user.

Figure 3:
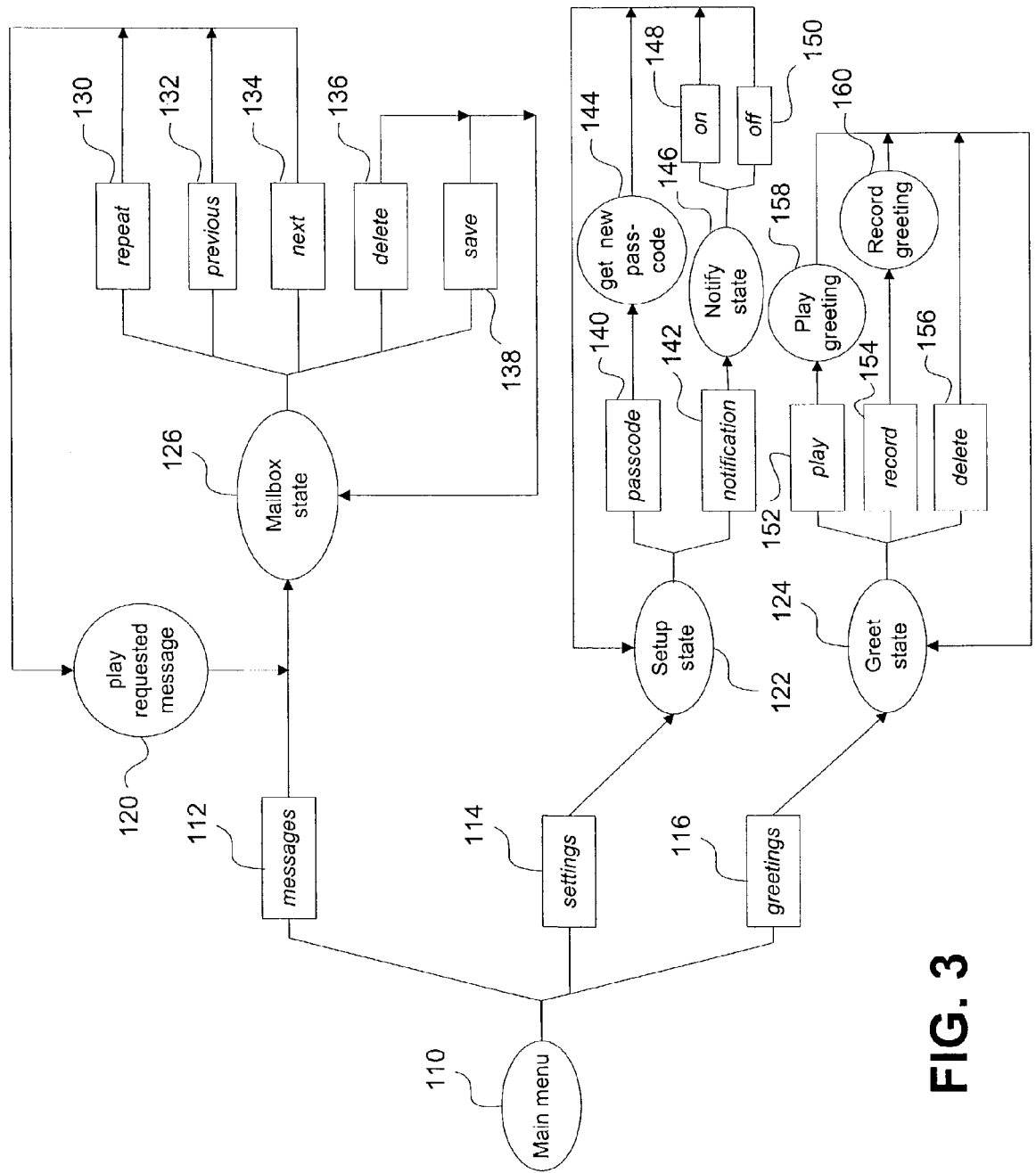
FIG. 3 is a flow diagram for a menu of a simplified IVR system.

An explanation of what is required to process speak-ahead responses from a user will be provided with reference to the simple IVR menu illustrated in FIG. 3. The ovals in FIG. 3 represent menu levels; the rectangles with italicized text represent possible responses of a user; and the circles represent prompts output by system 12 or further interactions with a user. After an initial prompt is generated to arrive at main menu 110, three possible responses can be recognized: "messages" 112, "settings" 114 and "greetings" 116. The responses 112, 114, 116 form a grammar for voice recognition at main menu level 110. To provide speak-ahead capability, the grammar at main menu level 110 has to be expanded to include recognition of words following "messages," "settings" and "greetings."

If the IVR application illustrated in FIG. 3 does not have speak-ahead capability or the user utters only a single word at main menu level 110, IVR system 112 moves to the mailbox state 126 when speech input "messages" 112 is recognized, or the setup state 122 or greet state 124 if "settings" 114 or "greetings" 116, respectively, are recognized. In mailbox state 126 a messaging menu is generated. The responses in the grammar for mailbox state 126 are "repeat" 130, "previous" 132, "next" 134, "delete" 136 and "save" 138.

As illustrated in FIG. 3, setup state 122 has a grammar of "passcode" 140 and "notification" 142. In response to detection of "passcode" 140, the system interacts 144 with the user to get a new passcode. The response "notification" 142 causes a transition to notify state 146 which has a grammar of "on" 148 and "off" 150. Greet state 124 has a grammar of "play" 152, "record" 154 and "delete" 156. Detection of response "play" 152 causes the system to play 158 the greeting that was previously recorded, while detection of the response "record" 154 causes the system to prompt for and record a new greeting.

Take as an example a user who just listened to a message that is related to a previous message with an unrelated message in between. If the IVR application 32 has speak-ahead capability that permits moving between messages, the user could say "previous, previous" to hear the related message again and then say "save, next, delete" to save the first message and delete the second message. Similarly, a user could respond to main menu 110 by saying "settings, passcode" to receive a prompt for and enter a new passcode or say "greetings, record" to record 160 a new greeting.

To add speak-ahead capability to an IVR application having a menu structure like that illustrated in FIG. 3, it is useful to generate a database 44 with a structure like that illustrated in FIG. 4. The first row of the table in FIG. 4 contains the names or descriptions of the fields in the rows below. As indicated in the first row, the second column contains the grammar of a possible response by a user. This may include multi-word responses and several synonyms for a single command. While FIG. 4 has words in the second column, the contents of this field in a database generated according to the present invention may be a pointer to a phonetically defined grammar for the word, or the grammar itself, as used by IVR system 12.

The first column of the table in FIG. 4 is a name used by database 44 to identify a state in the application. When the application is in a particular state, it listens for the words in the second column of all the rows having the same state name, which represent the set of available grammars, in that state. Thus, the first state shown in the table which has the name "main menu" (corresponding to main menu 110 in FIG. 3) consists of three rows, and has a pointer list to three grammars, i.e., listens for the words or phrases: "messages" 112, "settings" 114, and "greetings" 116. The third column indicates the next state of the application after hearing the word or phrase in column 2. For example, the second row represents the transition from state "Main menu" (110) to state "Setup" (122) on hearing the word "settings" (114).

An IVR application for which a multi-level database 44 exists in one language could be adapted for users who speak a different language by changing the contents of the "grammar" in the second column without changing any of the other columns. The only part of the table which is language-specific is the second column, from which the actual recognition grammars are created. Therefore, an equivalent application can be constructed for a different language simply by changing the contents of the second column.

The fourth and fifth columns of the table in FIG. 4 further define the menu structure and how the IVR system responds to a multi-level response by a user. The fourth column indicates whether a particular word spoken by a user is "terminal", i.e., whether subsequent words or phrases can be uttered by the user in the same utterance as the word or phrase which was used to enter that state. In the example illustrated in FIG. 4, a user can respond to main menu 110 with "settings, passcode", but subsequent words will either be ignored or cause the whole utterance to be rejected, because passcode is marked as terminal. In this case, the grammar is marked as terminal because further input will be required which will not use speak-ahead; in this case, a passcode will be requested from the user.

The fifth column of the table illustrated in FIG. 4 indicates whether a prompt is played when the named grammar is followed by another word or phrase in the same utterance from the user. In the example illustrated in FIG. 4, prompts are "forced" for the "delete" command. The user interface is designed to ensure that the user hears feedback when a message is deleted. Otherwise, "delete next", would merely play the next message, which might confuse the user. By forcing the prompt, the user interface ensures that the user hears a confirmation for the deleted message.

Figure 5:
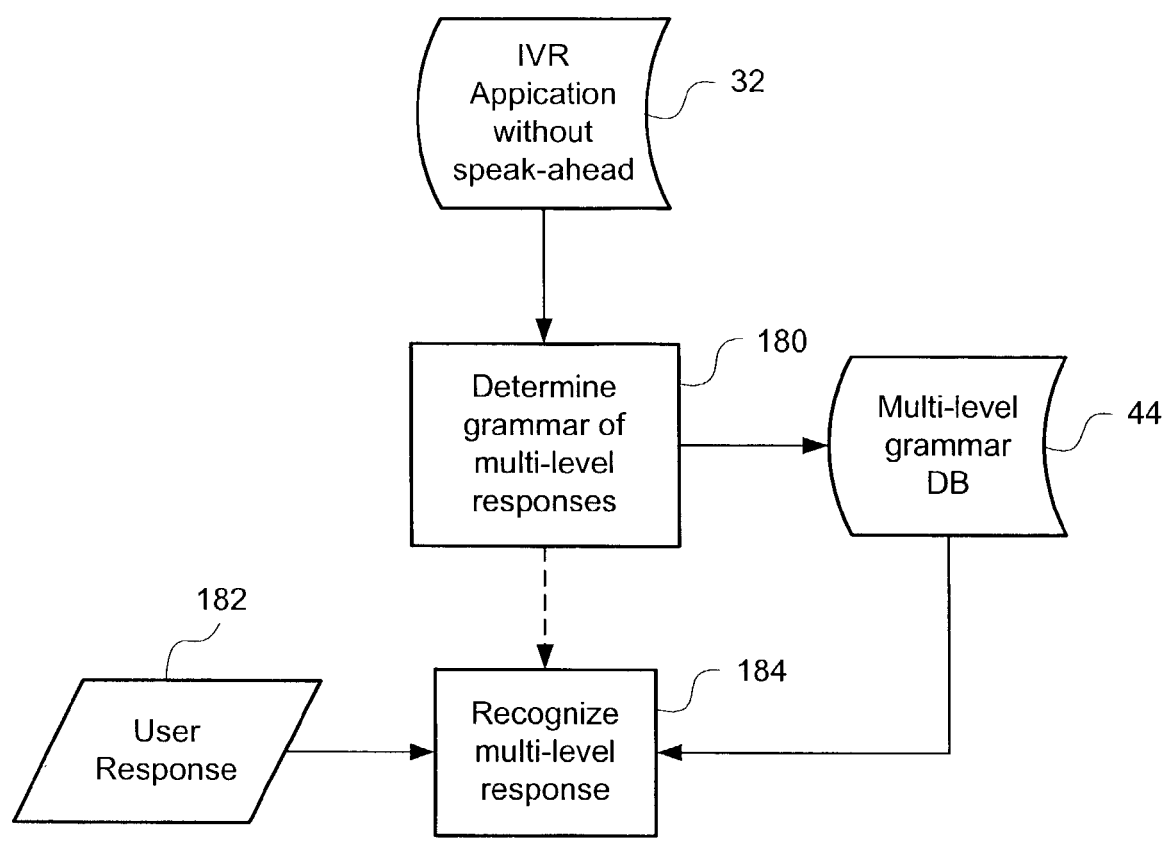
FIG. 5 is a flowchart of a method for automatically recognizing multiple levels of speech responses to a single prompt in a hierarchical menu.

In the preferred embodiment, database 44, as exemplified by the table illustrated in FIG. 4, is generated automatically in accordance with the steps illustrated in FIG. 5. Preferably, an IVR application 32 which does not include speak-ahead capability is defined in such a way that the logic for traversing menus can be automatically determined 180 to generate multi-level database 44. One way of providing structured logic flow is to use VoiceXML as described below to define IVR application 32.

Increasingly, voice applications are being implemented in a recently standardized language, VoiceXML. VoiceXML has a feature which provides the menu-like organization to which speak-ahead is most appropriately applied.

VoiceXML supports a <menu> tag. This tag allows an application developer to specify menus of just the type that lend themselves to speak-ahead. Following is an outline of an exemplary menu structure using VoiceXML:

```
<menu id="MainMenu">
    <choice next="#Mailbox">
        messages
    </choice>
    <choice next="#Setup">
        settings
    </choice>
    <choice next="#Greet">
        greetings
    </choice>
</menu>
<menu id="Mailbox">
    <choice next="#Mailbox">
        repeat
    </choice>
    <choice next="#Mailbox">
        previous
    </choice>
    <choice next="#Mailbox">
        next
    </choice>
    <choice next="#Mailbox">
        delete
    </choice>
    <choice next="#Mailbox">
        save
    </choice>
</menu>
<menu id="Setup">
    <choice next="#Setup">
        passcode
    </choice>
    <choice next="#Notify">
        notification
    </choice>
</menu>
<menu id="Greet">
    <choice next="#Greet">
        play
    </choice>
    <choice next="#Greet">
        record
    </choice>
    <choice next="#Greet">
        delete
    </choice>
</menu>
<menu id="Notify">
    <choice next="#Setup">
        on
    </choice>
    <choice next="#Setup">
        off
    </choice>
</menu>
```

It should be apparent how the example above relates to the table in FIG. 4. Each row in the table corresponds to one of the <choice> elements. The first column of the table in FIG. 4 is the ID of the <menu> element within which the <choice> occurs. The second column is the text content of the <choice> element. The third column is the "next" attribute of the <choice> tag. VoiceXML does not provide a mechanism for specifying the fourth and fifth columns, but they could either be predicted automatically or specified through the addition of new attributes on the choice tag. The sixth column represents the executable content which is omitted from this example and is not germane to the construction of speak-ahead grammars.

VoiceXML also has more conversational constructs called "forms". Within forms, there are 'fields', which need to be filled in by the user. A field be can specified as consisting of "options", which makes it very much like a menu. Speak-ahead could be automatically applied to such forms, as well.

Following is an example of a simple form which gathers information for searching scheduled flights:

```
<form>
    <field name="origin">
        <prompt>What city are you leaving from ?</prompt>
        <option value="BOS">boston</option>
        <option value="LAX">los angeles</option>
        <option value="DFW">dallas</option>
        ...
    </field>
    <field name="destination">
        <prompt>What city are you flying to ?</prompt>
        <option value="BOS">boston</option>
        <option value="LAX">los angeles</option>
        <option value="DFW">dallas</option>
        ...
    </field>
    <field name="class">
        <prompt>Would you like First, Business, or Coach class ?</prompt>
        <option value="plush">first class</option>
        <option value="comfortable">business class</option>
        <option value="steerage">coach</option>
    </field>
</form>
```

Such a simple form with fields consisting of a set of options can be automatically converted to add speak-ahead capability. This would enable a user to say, for example: "Boston, Los Angeles, first class", rather than waiting for each of the prompts. The table that would result would have a state for each field and each utterance would simply advance to the next state. The values of the fields would be used to distinguish which options were chosen. Note that such a streamlined application can be built manually in VoiceXML using form-level grammars, but speak-ahead can provide an enhancement to some existing applications without additional effort on the part of the application designer.

If IVR application 32 was created without using the structured syntax described above, or without using VoiceXML, it may be necessary to use a combination of automatic processing and manual editing to generate multi-level grammar database 44. Other tools could be developed for automatically generating the database for other application specification languages. As a last resort, the database can always be created manually.

After the multi-level grammar database 44 has been created, a user response 182 may be recognized 184, even if the user response is multi-level, i.e., responds to subsequent prompts that have not yet been generated. A dashed line is shown connecting the determination 180 of the grammar and the recognition 184 of user response 182, because there are two ways to implement the invention. The first is to fully determine the multi-level grammar 44 prior to receiving any response from a user. In this case, determination 180 could be performed once, long before recognition 184. However, all that is required is that the multi-level of grammar database 44 includes all sequences of responses from a current menu level to until "terminal" grammars are reached.

The present invention has been described with respect to a simplified IVR menu. However, it should be readily apparent that the invention is applicable to much more complicated IVR menus and is not limited to applications in VoiceXML, but can be used with speech application language tags (SALT) or any other method of specifying the grammar and structure of an IVR.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of creating a grammar used in an interactive voice response system generating prompts based on a menu, comprising:
    obtaining a first grammar specifying a first set of responses to a first prompt;
    obtaining a second grammar specifying a second set of responses to a second prompt subsequent to the first prompt;
    automatically producing a third grammar with a third set of responses to the first prompt that includes the first set of responses and concatenated responses, each combining one response in the first set of responses and one response in the second set of responses to form a sequence of the one response in the first set of responses and one response in the second set of responses.

2. An interactive voice response system, comprising:
    a storage unit storing data defining prompts to users, grammars of acceptable responses and a menu of the prompts, all ready for use in said interactive voice response system;
    a composite grammar generator, coupled to said storage unit, automatically generating a composite grammar of acceptable responses by:
        (a) obtaining a first grammar specifying a first set of responses to a first prompt;
        (b) obtaining a second grammar specifying a second set of responses to a second prompt subsequent to the first prompt; and
        (c) automatically producing a third grammar with a third set of responses to the first prompt that includes the first set of responses and concatenated responses, each combining one response in the first set of responses and one response in the second set of responses to form a sequence of the one response in the first set of responses and one response in the second set of responses; and
    a speech recognizer, coupled to said storage and said composite grammar generator, recognizing speech input in response to a current prompt, as the sequence of the one response in the first set of responses and one response in the second set of responses, based on the composite grammar of acceptable responses that includes an utterance responding to the subsequent prompt.

* * * * *